United States Patent [19]

Takabayashi

[11] Patent Number: 4,741,978
[45] Date of Patent: May 3, 1988

[54] FUEL CELL GENERATOR CONTROL SYSTEM

[75] Inventor: Yasuhiro Takabayashi, Kanagawa, Japan

[73] Assignee: Fuji Electric Co., Ltd., Kanagawa, Japan

[21] Appl. No.: 84,146

[22] Filed: Aug. 12, 1987

[30] Foreign Application Priority Data

Aug. 14, 1986 [JP] Japan ................ 61-190853

[51] Int. Cl.⁴ .................................. H01H 8/04
[52] U.S. Cl. ........................... 429/23; 429/24; 429/19
[58] Field of Search ............ 429/19, 22, 23, 24, 429/17, 21, 25

[56] References Cited

U.S. PATENT DOCUMENTS 3,580,741 5/1971 Hovious et al. .............. 429/23
3,585,077 6/1971 Waldman ................ 429/23 X
3,753,780 8/1973 Fetterman ................... 429/23

Primary Examiner—Anthony Skapars
Attorney, Agent, or Firm—Finnegan, Henderson Farabow, Garrett & Dunner

[57] ABSTRACT

There has been provided a fuel cell generator control system to control the operation of a fuel cell generator that includes a fuel cell body, a fuel supply section for supplying fuel to the fuel cell body, and an air supply section for supplying air to the fuel cell body. The purpose of the fuel cell generator control system is to protect the fuel cell generator from damage due to abnormal conditions in the fuel cell body or the fuel supply section. The control system comprises: a means for detecting an abnormal condition in the fuel cell body or the fuel supply section and for outputting an abnormal condition signal; a secondary battery charged by the output voltage of the fuel cell body; a control section for outputting a trouble signal in response to the application of an abnormal condition signal; and a voltage path control means for connecting the secondary battery to the fuel supply section and the air supply section through a first voltage path and, in response to the trouble signal, for disconnecting the secondary battery from the first voltage path and thus connecting the secondary battery to the air supply section through a second voltage path.

8 Claims, 3 Drawing Sheets

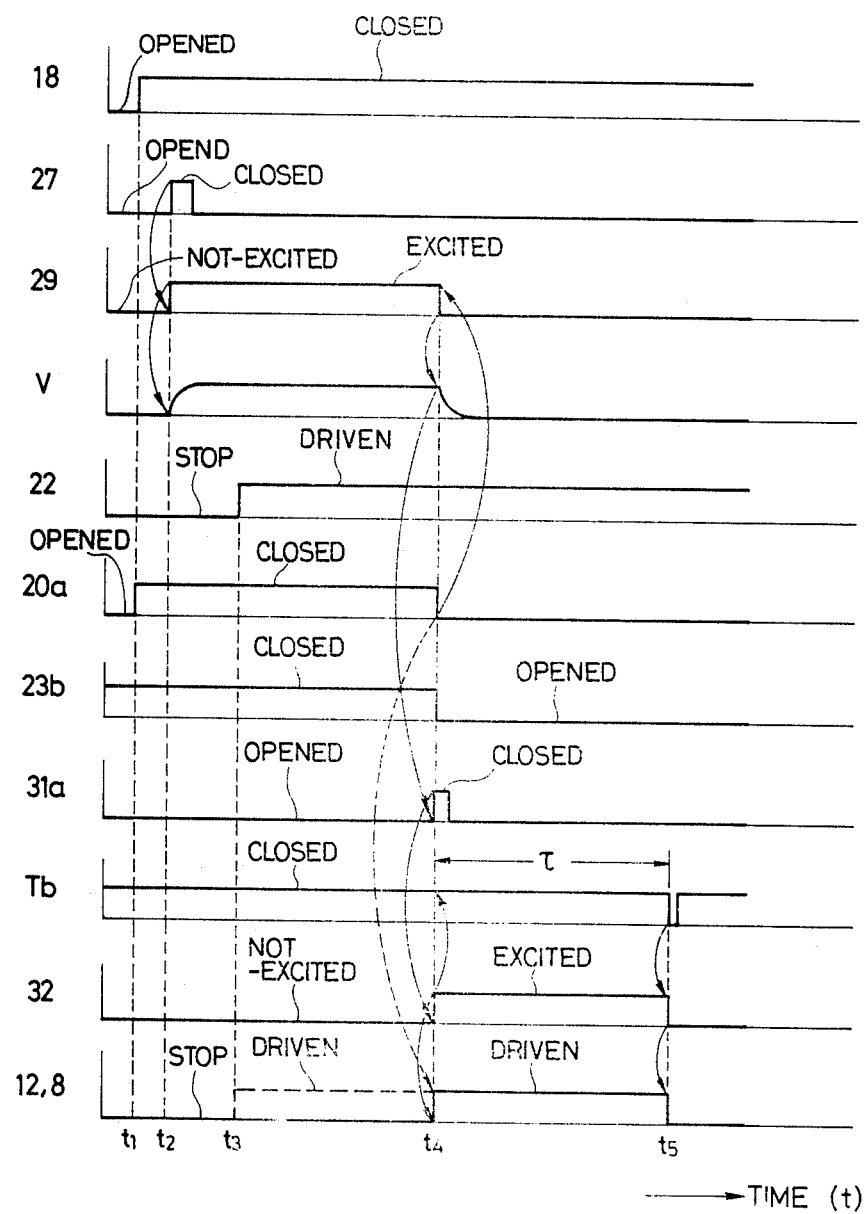

FUEL CELL GENERATOR CONTROL SYSTEM

BACKGROUND OF THE INVENTION

I. Field of the Invention

This invention relates to a fuel cell generator control system which, in response to the occurrence of an abnormal condition, controls a safety operation to protect the fuel cell generator from damage. At the same time, the present invention is simple in construction and low in power consumption.

II. Background Information

A plant device including a fuel cell generator is generally designed so that, when a abnormal condition takes place therein, the device carries out a predetermined operation to protect itself and people near the device. Generally, to achieve this result two systems each comprising a plant body, a control equipment section for controlling the operation of the plant body, and a power source equipment section for supplying electric power to the control equipment section are provided for the plant device. The two systems are operated in such a manner that one of the systems is always operating. However, when one system malfunctions, the other system is put into operation, so that the plant is in operation at all times. Thus, continuous operation of the plant may be achieved for all the essential devices forming the plant by replacing the essential devices with backup devices when malfunctions occur. For example, when the power source equipment section malfunctions, then that section is replaced by a secondary battery which has been floating-charged by the section. When an abnormal condition occurs in the plant device, the operator is protected from hazards and the plant device is protected from damage. However, this method causes the plant device to become complex and large in scale, with the result that power consumption is increased accordingly. Hereinafter, the operation of the plant device which is carried out to protect the plant device and the people nearby will be referred to as the "safety operation," when applicable.

SUMMARY OF THE INVENTION

An object of the present invention is to eliminate the above-described difficulties accompanying a conventional fuel cell generator.

Another object of the present invention is to provide a fuel cell generator control system which would control the normal and safety operations of a fuel cell generator in such a manner that the fuel cell generator system would be small, simple in construction, and low in power consumption.

Accordingly, to achieve the foregoing objects there has been provided a fuel cell generator control system to control the operation of a fuel cell generator that includes a fuel cell body, a fuel supply section for supplying fuel to the fuel cell body, and an air supply section for supplying air to the fuel cell body. The fuel cell generator control system is for protecting the fuel cell generator from damage due to abnormal conditions in the fuel cell body or the fuel supply section. The control system comprises means for detecting an abnormal condition in the fuel cell body or the fuel supply section and for outputting an abnormal condition signal; a secondary battery charged by the output voltage of the fuel cell body; a control section for outputting a trouble signal in response to the application of an abnormal condition signal; and a current path control means for connecting the secondary battery to the fuel supply section and the air supply section through a first voltage path and, in response to the trouble signal, for disconnecting the secondary battery from the first voltage path and thus connecting the secondary battery to the air supply section through a second voltage path.

BRIEF DESCRIPTION OF THE DRAWINGS

FIG. 3 is a time chart of the operation of the fuel generator control system.

DETAILED DESCRIPTION OF THE PREFERRED EMBODIMENT

Figure 1:
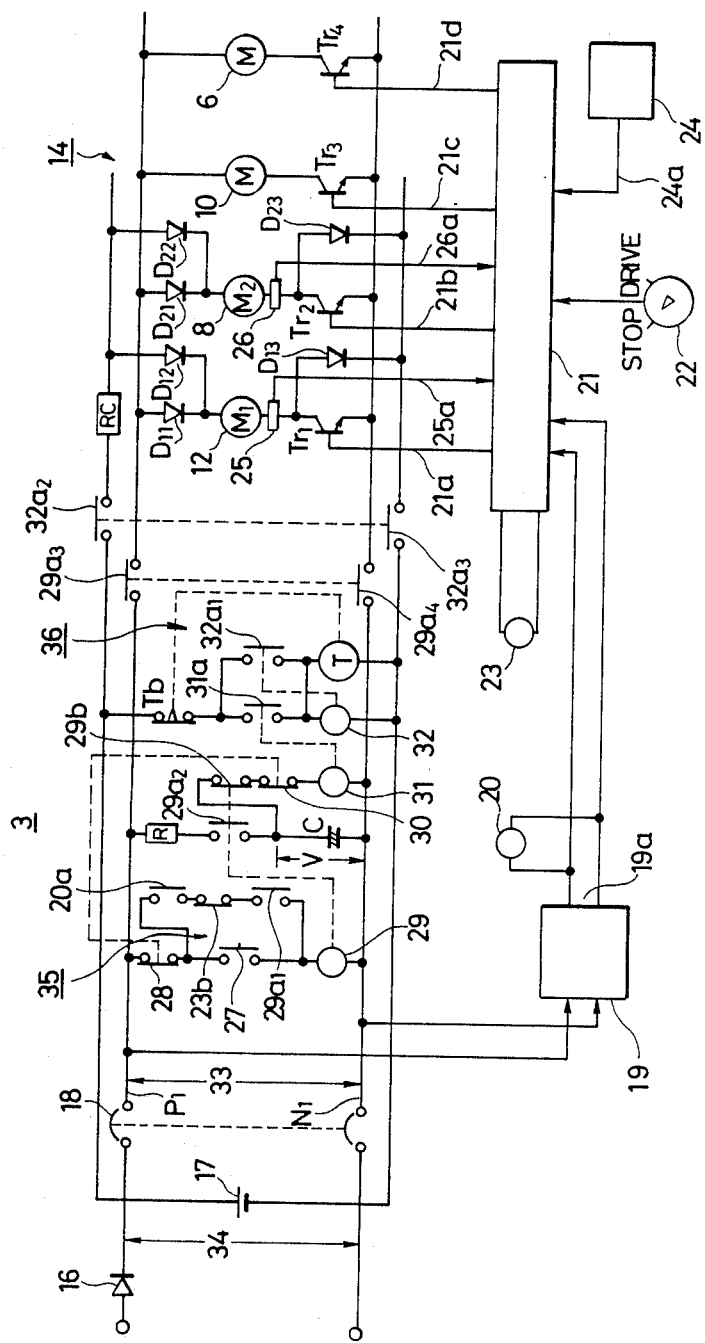
FIG. 1 is a detailed diagram of the preferred embodiment of a fuel cell generator control system along with the first and second pumping motor means and the first and second blowing motor means of the fuel supply section of FIG. 2.
Figure 2:
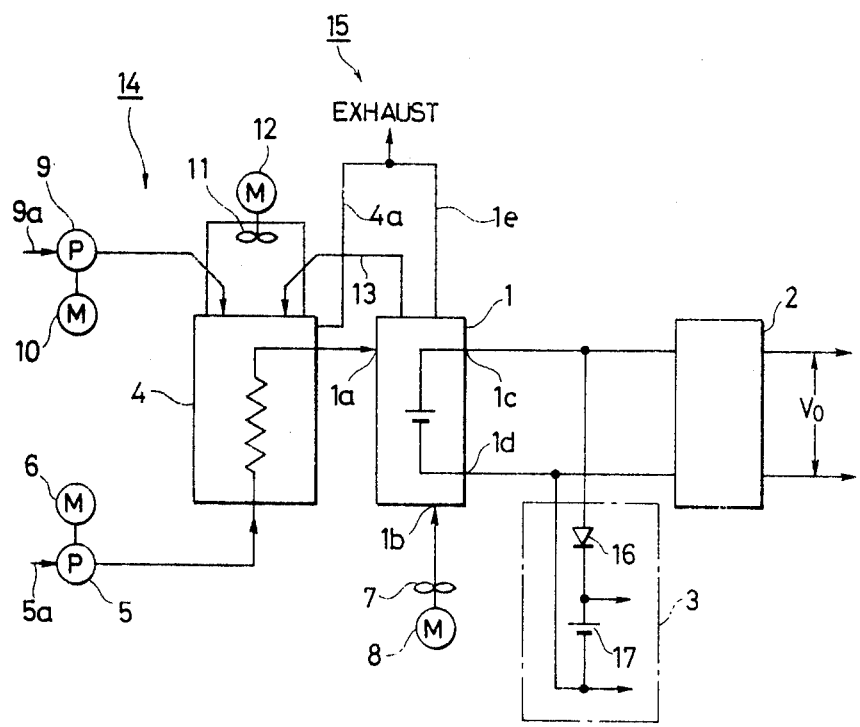
FIG. 2 is a block diagram of a fuel cell generator incorporating a fuel cell generator control system 3.

FIG. 1 is a diagram outlining the arrangement of one embodiment of this invention, i.e., a fuel cell generator control system. FIG. 2 is a diagram showing the connection of the essential components of a fuel cell generator.

FIG. 2 illustrates a fuel cell body 1 with fuel supply inlets 1a and 1b and voltage output terminals 1c and 1d. The terminals 1c and 1d are connected to a converter 2 for converting a voltage developed across the terminals 1c and 1d into a predetermined voltage output $V_O$, and to control circuit 3 (described later). FIG. 2 also illustrates a fuel reformer 4 for reforming a raw material 5a supplied by a first pump 5 to obtain hydrogen gas and supplying the gas to the fuel supply inlet 1a; a first electric pumping motor means 6 for driving the first pump 5; and a first blower 7 driven by a first blowing motor means 8 to supply air to the fuel supply inlet 1b. The air is used as a fuel in the fuel cell body 1 and cools electrodes in the body 1. Reference numeral 9 designates a second pump for supplying a reformer heating fuel 9a to the reformer 4; and 10, a second electric pumping motor means for driving the second pump 9. The fuel 9a is burnt in the reformer 4 to reform the material 5a into hydrogen gas. Reference numeral 11 designates a second blower which is driven by a second blowing motor means 12 to deliver air into the reformer 4. The air is used as a combustion improver for the fuel 9a, and it is used to remove gas from the reformer 4.

Furthermore, FIG. 2 illustrates an off-gas pipe 13 through which the surplus of the hydrogen gas (the so-called "off gas") supplied into the fuel cell body 1 through the inlet 1a is returned into the reformer 4. The off gas thus returned is burnt in the reformer 4 to help the combustion of the fuel 9a. The figure also illustrates an exhaust pipe 4a for discharging the combustion waste gas formed in the reformer 4; an exhaust pipe 1e for exhausting the fuel cell body 1 of the remaining air; a fuel supply section 14 consisting of all the components shown in FIG. 2 except the body 1, the converter 2, blowers 7 and 11 and blowing motor means 8 and 12 and the control circuit 3; and a voltage generating section 15 consisting of the fuel cell body 1 and the fuel supply section 14. Blowers 7 and 11 and blowing motor means 8 and 12 constitute the air supply section.

FIG. 1 is a diagram showing the connection of components of the fuel cell generator control system 3. In FIG. 1, reference numeral 17 designates a secondary battery which is subjected to a floating charge by the output voltage of the fuel cell body 1; and 16, a reverse current preventing diode. For convenience in description, FIG. 1 also shows the motors 6, 8, 10 and 12 of FIG. 2, which are connected as required. Reference numeral 19 designates a third circuit means for outputting a third electric power 19a having a predetermined constant voltage. The input voltage to third circuit means 19 is supplied by secondary battery 17 through an overcurrent interrupter 18. The third circuit means 19 is provided with a no-voltage detecting relay 20 with a contract means 20a which is closed when the third electric power 19a is outputted, and is opened when the electric power 19a is eliminated. The third electric power 19a is supplied to a control section 21. The control section 21 is so designed that it performs a control operation (described later) when an operating switch 22 is positioned to "Drive," and it suspends the control operation when it is positioned to "Stop."

The control section 21 is provided with a trouble signal output relay 23. The relay 23 is so designed that when an abnormal condition occurs in the control section 21 or an abnormal condition detection signal 24a is applied to the section 21, its coil is excited to open a contact means 23b. The above-described operation of the relay 23 occurs only when the third electric power 19a is supplied to the control section 21 and the operating switch 22 is positioned to "Drive."

The abnormal condition detection section 24 is so designed as to output the signal 24a when an abnormal condition is detected in the voltage generating section 15 in FIG. 2. Such abnormal conditions include an abnormal temperature rise in the fuel cell body 1, or an abnormal temperature rise in essential components of the fuel supply section 14. Therefore, the number of abnormal condition detecting sections 24 provided is preferably equal to the number of abnormal conditions to be detected.

Further in FIG. 1, reference numerals 25 and 26 designate overcurrent detecting relays for detecting overcurrents in the motors 12 and 8, respectively; and 25a and 26a, overcurrent detection signals outputted by the relays 25 and 26, respectively. The relays 25 and 26 also function as abnormal condition detecting sections for detecting abnormal conditions in the voltage generating section 15. As shown in FIG. 1, the signals 25a and 26a are applied to the control section 21. Upon reception of the signals 25a and 26a, the control section 21 operates to excite the output relay 23 to open its contact means 23b. When the operating switch 22 is positioned to "Drive" with the third electric power 19a supplied to the control section 21, control section 21 outputs control signals 21a, 21b, 21c and 21d as required. The control signals 21a, 21b, 21c and 21d render transistors Tr1, Tr2, Tr3 and Tr4 conductive, respectively.

Further in FIG. 1, reference numeral 27 designates a manual a contact means, i.e., a normally open contact means which is closed when depressed and opened when released; 28, a manual b contact means, i.e., a normally closed contact means which is opened when depressed and closed when released; and 29, an electromagnetic contactor having four a contact means 29a1, 29a2, 29a3 and 29a4 and one b contact means 29b. The contact means 28, the contact means 27 and the contactor 29 are series-connected, in the stated order between the positive potential P1 and the negative potential of the secondary battery 17 through the interrupter 18. The contact means 27 is shunted by a series circuit of the contact means 20a, 23b and 29a1 connected in the stated order. A series circuit of a resistor R, the contact means 29a2 and a capacitor C is connected between the positive potential P1 and the negative potential N1. The capacitor C is shunted by a series circuit of the contact means 29b, a contact means 30 and a relay 31 connected in the stated order. The contact means 30 is a manual b contact means operated in association with the contact means 28. The relay 31 has a momentarily operated a contact means 31a. The a contact means 31a is connected in series to an electromagnetic contactor 32 having three a contact means 32a1, 32a2 and 32a3, and is shunted by the contact means 32a1. The electromagnetic contactor 32 is shunted by a timer T having a time limit operation and instantaneous return type b contact means Tb.

The contact means 29a3 and 29a4, when closed, apply the positive potential P1 and the negative potential N1 to the ends of a series circuit consisting of a diode D11, the motor 12 and the transistor Tr1, a series circuit of a diode D21, the motor 8 and the transistor Tr2, a series circuit of the motor 10 and the transistor Tr3, and a series circuit of the motor 6 and the transistor Tr4. The contact means 32a2 when closed, outputs the positive potential of the secondary battery 17 through a resistor Rc. The positive potential thus outputted is applied to a diode D12 which is connected through the motor 12 to a diode D13, and to a diode D22 which is connected through the motor 8 to a diode D23. The contact means 32a3 applies the negative potential of the secondary battery 17 to the cathodes of the diodes D13 and D23, when closed. The motors 12, 8, 10 and 6, the transistors Tr1, Tr2, Tr3 and Tr4, and the diodes D11 and D21 have been connected as described above, and therefore upon application of the control signals 21a through 21d, the transistors Tr1 through Tr4 are rendered conductive to allow the operations of the motors 12, 8, 10 and 6.

The operations of the circuit elements in FIGS. 1 and 2 will be described with reference to a time chart of FIG. 3. The first operation to be done for starting the generator of FIG. 2 is to close the overcurrent interrupter 18. This time instant is designated by reference character $t_1$ in the time chart of FIG. 3. As a result, the third circuit means 19 outputs the third electric power 19a to close the contact means 20a of the no-voltage detecting relay 20. In this operation, the operating switch 22 is maintained positioned to "Stop", and therefore the trouble signal output relay 23 is not excited yet and its contact means 23b is maintained closed; however, as the electromagnetic contactor 29 is not excited, the relay 31, the electromagnetic contactor 31 and the timer T are not energized yet. As the operating switch 22 is positioned to "Stop" as described above, the aforementioned control operation is not yet carried out by the control section 21, and accordingly the motors 12, 8, 10 and 6 are not in operation.

Next, at the time instant $t_2$, the contact means 27 is closed for a short period of time. As a result, the contactor 29 is excited, and self-held by the contact means 29a1. Therefore, the capacitor C is charged through the resistor R and the contact means 29a2 by the positive potential P1, so that the voltage V of the capacitor C is raised as shown in FIG. 3. At the same time, the contact means 29b is opened, and therefore the relay 31, the contactor 32 and the timer T are still in a non-excitation state. When the contactor 29 is excited as described above, the contact means 29a3 and 29a4 are closed to supply the positive potential P1 to the motors 12, 8, 10 and 6. However, these motors are not started yet because the control signals 21a through 21d are not produced by the control section 21 yet.

At the time instant t₃, the operating switch 22 is positioned to "Drive". As a result, the control signals 21a through 21d are outputted by the control section, causing transistors Tr₁ through Tr₄ to conduct, allowing motors 12, 8, 10 and 6 to operate. Thus, the generator shown in FIG. 2 carries out an electricity generating operation correctly.

It is assumed that, at the time instant t₄, a trouble occurs in the third circuit means 19, and the third electric power 19a is eliminated. Upon elimination of the power 19a, the control section 21 outputs none of the signals 21a through 21d, so that all the motors 12, 8, 10 and 6 are stopped. As a result, combustible gas is allowed to stay in the reformer 4, resulting in a danger of an explosion taking place in the reformer 4. In addition, ventilation in the fuel cell body 1 is stopped, so that the electrodes in the fuel cell body 1 may be damaged by being kept at a high temperature for a long time. On the other hand, when the electric power 19a is eliminated as was described above, the contact means 20a is opened, so that the contactor 29 self-held is released, and the contact means 29b is closed. As a result, the capacitor C is discharged through the contact means 29b, the contact means 30 and the relay 31, so that the contact means 31a is closed. Upon closure of the contact means 31a, the contactor 32 is excited, so that the timer T is excited through the contact means Tb and 32a1 to start its operation. In this operation, the contactor 32 is self-held by the contact means 32a1, and therefore the voltage V of the capacitor C is gradually decreased, and even when the contact means 31a of the relay 31 is opened, the operation of the timer T will not be suspended.

As described above, when the supply of the electric power 19a is suspended, the motors 12, 8, 10 and 6 are stopped. In this case, the contactor 32 is excited as described above to close the contact means 32a2 and 32a3, so that the voltage of the secondary battery 17 is applied to both the series circuit of the diode D12, the motor 12 and the diode D13 and the series circuit of the diode D22, the motor 8 and the diode D23. Accordingly, the motors 12 and 8, irrespective of the control signals 21a and 21b, are rotated, so that the dangerous gas is removed from the reformer 4 and the electrodes in the body 1 are cooled down. This protects the generator and its operator from danger. That is, in the event that the electric power supply section 19 malfunctions and stops outputting the electric power 19a, only the motors 12 and 8 operate to secure the system. As described later, the motors 12 and 8 are so designed as to rotate for a period of time set by the timer T. The period of time is set to the minimum value required for safety purposes.

At time t₅, when the period of time set by the timer T has passed from the time instant t₄, the contact means Tb is opened, so that the contactor 32 self-held is released. Therefore, the contact means 32a2 and 32a3 are opened to stop the motors 12 and 8. At the same time, the timer T is reset by the contact means Tb which has been opened as described above, so that the contact means Tb is closed again. Thereafter, the motors 12, 8, 10 and 6 are not operated, and therefore the operation of the generator is safety stopped.

If, in FIG. 1, with the contact means 27 closed, the contact means 28 is opened when all the elements are being operated normally, then the contactor 29 is released from self-holding. Normally capacitor C would discharge through the relay 31. However, C does not discharge through 31 because, at the same time, the contact means 30 is opened, so that the relay 31 will not be excited. Accordingly, the contactor 32 and the timer T will not be excited. Therefore, the supply of the electric power to the motors 12, 8, 10 and 6 is interrupted by the contact means 29a3, 29a4, 32a2 and 32a3, so that the generator is stopped.

If, when all the elements of FIG. 1 are being operated correctly with the contact means 27 closed and with the operating switch 22 positioned to "Drive", a malfunction such as a short-circuit occurs in the load of the over-current interrupter 18 so as to activate the latter, then similarly as in the above-described case of trouble in the third circuit means 19, the contact means 32a2 and 32a3 are closed. This causes motors 12 and 8 to carry out the safety operation for the system.

If, in the case where all the elements of FIG. 1 are being operated normally as was described above, the relay 23 is excited because control section 21 malfunctions, or because the abnormal condition detection signal 24a as well as the overcurrent detection signals 25a and 26a are applied to the control section, then the contact means 23b is opened. Consequently, the system again carries out the safety operation.

The fuel supply section 14 shown in FIG. 1 comprises the resistor Rc, the diodes D11 through D13 and D21 through D23 and the transistors Tr1 and TR2 in addition to the above-described elements, and operates as described above. That is, when the fuel supply section 14 receives the control signals 21a through 21d and first electric power 33, which is the voltage between the positive potential P1 and the negative potential N1 supplied through the contact means 29a3 and 29a4 when closed, the section 14 carries out a fuel supply operation according to these control signals to supply hydrogen gas and air as fuel to the fuel supply inlets 1a and 1b. Furthermore, when a second electric power 34 provided by the output voltage of the secondary battery 17 is supplied to the fuel supply section through the contact means 32a2 and 32a3, the fuel supply section 14 operates the motors 12 and 8 while the power 34 is being supplied to the section, thereby continuing the safety operation. The term "safety operation" as used herein is intended to mean the operation of removing dangerous gas from the reformer 4 and cooling the electrodes in the fuel cell body 1.

Further in FIG. 1, reference numeral 35 designates a first circuit means comprising the contact means 27, 28, 20a, 23b and 29a1 through 29a4, and the contactor 29; reference numeral designates 36, a second circuit means comprising the resistor R, the capacitor C, the contact means 29a2, 29b, 30, 31, 32a1 through 32a3 and Tb, the relay 31, the contactor 32 and the timer T. The components of the circuit means 35 and 36 operate as described above. That is, in the first circuit means, when a first operating signal to close the contact means 27 is applied thereto, the contact means 29a3 and 29a4 are closed to apply the first electric power 33 to the fuel supply section 14; when a second operating signal to open the contact means 28 is applied thereto, the contact means 29a3 and 29a4 are opened to suspend the application of the first electric power 33; and when a first trouble signal to open the contact means 20a or a second trouble signal to open the contact means 23b is applied thereto, a first signal to open the contact means 29a2 is supplied to the second circuit means 36. In the circuit means 36, when a signal to open the contact means 29a2 is applied thereto, the contact means 32a2 and 32a3 are closed to apply the second electric power 34 to the fuel supply section 14 for the predetermined period of time.

In the present invention, when the overcurrent interrupter operates in response to the occurrence of an abnormal condition such as short-circuiting in its load or when the third circuit means malfunctions and stops the supply of the third electric power, the first trouble signal is outputted, and when trouble takes place in the voltage generating section or control section, the second trouble signal is outputted, so that the fuel supply section carries out the predetermined safety operation for the minimum required period of time. Unlike a conventional plant device, it is unnecessary to provide two sets of essential elements to carry out the safety operation for a fuel cell generator controlled by the present invention. Consequently, a fuel cell generator controlled by the present invention performs a safety operation while being simple in construction and low in power consumption.

What is claimed is:

1. A fuel cell generator control system to control the operation of a fuel cell generator that includes a fuel cell body, a fuel supply section for supplying fuel to the fuel cell body, and an air supply section for supplying air to the fuel cell body, the control system for protecting the fuel cell generator from damage due to abnormal conditions in the fuel cell body or the fuel supply section, the control system comprising:

means for detecting an abnormal condition in the fuel cell body or the fuel supply section and for outputting an abnormal condition signal;

a secondary battery charged by an output voltage of the fuel cell body;

a control section for outputting a trouble signal in response to the application of said abnormal condition signal;

a current path control means for connecting said secondary battery to the fuel supply section and the air supply section through a first current path and, in response to said trouble signal, for disconnecting said secondary battery from the first voltage path and then connecting said secondary battery to the air supply section through a second current path.

2. A fuel cell generator control system according to claim 1, wherein said current path control means further includes:

first circuit means for connecting said secondary battery to the fuel supply section and the air supply section through said first current path; and second circuit means for connecting said secondary battery to the air supply section through said second current path.

3. A fuel cell generator control system according to claim 1, wherein said control section further includes means for outputting said trouble signal in response to an abnormal condition within the control section and means for outputting a plurality of control signals to the fuel supply section and the air supply section.

4. A system according to claim 3 further comprising third circuit means for supplying a control supply voltage to said control section and for outputting said trouble signal when said control supply voltage exceeds a predetermined value.

5. A system according to claim 3 further comprising:
    a fuel cell body having fuel supply inlets;
    a fuel supply section which, when connected to said first current path and in response to said control signals, supplies fuels to said fuel supply inlets; and
    an air supply section which, when connected to said first or said second current path, supplies air to said fuel supply section and to one of said fuel supply inlets of said fuel cell body.

6. A system according to claim 5, wherein said fuel supply section comprises:
    a fuel reformer to convert a raw material to hydrogen gas as fuel for said fuel cell body;
    a first pump and a first pumping motor means for driving said first pump to supply said fuel reformer with said raw material;
    a second pump and a second pumping motor means for driving said second pump to supply a reformer heating fuel to said fuel reformer, wherein both said first and said second pumping motor means are in operation when connected to said first current path.

7. A system according to claim 6, wherein said air supply section comprises:
    a first blower and a first blowing motor means for driving said first blower to supply air to one of said fuel supply inlets of said fuel cell body; and
    a second blower and a second blowing motor means for driving said second blower to supply air to said fuel reformer, wherein both said first and said second blowing motor means are in operation when connected to said first or said second current path.

8. A system according to claim 1, further comprising an overcurrent interrupter means for connecting said secondary battery to said first current path and for detecting an overcurrent flowing through said first current path and, in response to said overcurrent, breaking said first current path and outputting said trouble signal.

* * * * *